United States Patent [19]

Worst

[11] 4,147,297
[45] Apr. 3, 1979

[54] LAUNDRY MACHINE IMPROVED WATER TEMPERATURE CONTROL AND METHOD

[75] Inventor: Joseph C. Worst, Louisville, Ky.

[73] Assignee: General Electric Company, Louisville, Ky.

[21] Appl. No.: 839,135

[22] Filed: Oct. 3, 1977

[51] Int. Cl.² ............................................. G05D 11/16
[52] U.S. Cl. .................................. 236/12 A; 68/12 R; 134/57 R; 137/90
[58] Field of Search ............. 236/12 A, 47; 134/57 R, 134/57 D; 68/12; 137/90

[56] References Cited

U.S. PATENT DOCUMENTS

| | | | |
|---|---|---|---|
| 1,022,189 | 4/1912 | Geissinger | 236/47 |
| 1,720,723 | 7/1929 | Dodge | 236/47 U |
| 2,533,624 | 12/1950 | Ray | 137/90 X |
| 2,844,321 | 7/1958 | Witherspoon, Jr. | 236/12 A |
| 3,917,165 | 11/1975 | Cross | 236/47 |
| 3,948,441 | 4/1976 | Perkins et al. | 236/46 R |
| 4,002,292 | 1/1977 | Parks | 236/46 R |

*Primary Examiner*—William E. Wayner
*Attorney, Agent, or Firm*—Bruce A. Yungman; Frederick P. Weidner

[57] ABSTRACT

A temperature sensing system for controlling the temperature of fill water in an automatic washer having an inlet hot water valve and an inlet cold water valve. The inlet hot water valve is continuously open during fill and the inlet cold water valve is normally closed during fill. A first predetermined temperature level of the incoming hot water is sensed and also a second predetermined level of incoming hot water is sensed, the second temperature level being lower than the first temperature level. A switch is provided to bypass the sensing of the second predetermined temperature level of the incoming hot water. This switch allows the user of the clothes washer to preselect either of two water temperature levels desired. When both the inlet hot water temperature is above the first temperature level and the sensing of the second temperature level is bypassed, the cold water valve is opened by a control. The control will also open the cold water valve when the second temperature sensing is not bypassed and the hot water temperature is above the second temperature level.

10 Claims, 3 Drawing Figures

LAUNDRY MACHINE IMPROVED WATER TEMPERATURE CONTROL AND METHOD

BACKGROUND OF THE INVENTION

This invention relates to laundry machines, and more particularly, to automatic clothes washers that have a water temperature control, and to a method of controlling the water temperature.

Controlling the mixing of hot and cold water introduced into an automatic washing machine has been known for many years. By controlling the hot and cold water valves of the machine, the temperature of the mixed water may be regulated. Typically a temperature responsive switch, such as a thermostat, is located downstream of the water valves to sense the temperature of the mixed water and through approximate control and circuit means the opening and closing of the hot and cold water valves is controlled responsive to some predetermined temperature setting of the thermostat. One such typical arrangement is shown and described in U.S. Pat. No. 2,844,320 wherein the water valves are controlled by a thermostat located along a mutual output water line to the washing machine tub. Such an arrangement, however, has been found to detrimentally affect both the thermostat and the water valves due to their excessive cycling on and off because of the rapid changes in the water temperature in the output water line.

Another arrangement that has been utilized is shown and described in U.S. Pat. No. 2,533,624 wherein the thermostat is located in a temperature sensing relationship with the washing machine tub which contains the mixed water. U.S. Pat. No. 2,619,284 also shows a thermostat located on the tub. Such an arrangement, however, results in some basic difficulties. In most automatic washing machines there is an adjustment for the clothes load and therefore the level of water introduced into the tub for a given washing operation. The thermostat cannot have a fixed ideal location on the tub as the level of the mixed water varies. Another problem is that the long time delay in the thermostat sensing the change in temperature of the relatively large volume of water in the tub does not allow for accurately controlling the water valves to regulate the mixed water temperature.

Controlling mixing of hot and cold water can be mechanically controlled by having the hot water temperature control mixing of the hot and cold and the mixed temperature controlling the cold water flow as is shown and described in U.S. Pat. No. 3,007,644. This mechanical control valve has particular application for use in a hot water line as from a boiler so that the temperature of the water to a sink, wash tub, or appliance is maintained below a predetermined single elevated temperature. There are also mixing valves such as the mixing valve disclosed in U.S Pat. No. 2,747,801 wherein a thermostatic rod having a single maximum elevated temperature limit may be used to mechanically adjust the hot and cold mixing. Such a mixing valve, however, can be bypassed for very hot water if the user of the domestic appliance so desires.

Therefore, in the prior art water temperature control arrangements for clothes washers, sometimes the control is so sensitive to changes in temperature of the mixed water leaving the water valve that the thermostat and valve excessively cycle on and off, thus detrimentally affecting the life of those components. In some cases the sensing of the water in the tub is not accurate and maintaining the proper temperature control of the mixed water is not achieved. In some other cases a single maximum elevated temperature limit is preset into a mechanical device which device in most cases is quite complicated in design and operation and may be capable of being bypassed above the maximum elevated temperature.

By my invention, I have provided an automatic clothes washer with an improved water temperature control and method which can control either of two different selectable temperature levels such that the water filling the washer will always be maintained below either of the predetermined and preselected temperature levels. Moreover, this invention is an electromechanical system which is easy to implement, is quite low in cost and is effective to produce the desired results.

BRIEF SUMMARY OF THE INVENTION

There is provided in an automatic washer having an inlet hot water valve and an inlet cold water valve, a temperature sensing control means for controlling the temperature of fill water. There is means to keep the inlet hot water valve continuously open during fill and means to keep the inlet cold water valve normally closed during fill. There is first means for sensing a first predetermined temperature level of the incoming hot water and second means for sensing a second predetermined level of incoming hot water, said second temperature level being lower than the first temperature level. Switch means are provided to bypass the second means for sensing the second predetermined temperature level of the incoming hot water. Such switch means may be a manually operated switch on the automatic washer for preselection of either of the two water temperature levels desired by the machine user. Control means is provided such that when both the hot water temperature is above the first temperature level and the second sensing means is bypassed the cold water valve is opened. The control means will also open the cold water valve when the second sensing means is not bypassed and the hot water temperature is above the second temperature level.

By this arrangement either of two different selectable water temperatures may be chosen by the clothes washer user and the selected temperature level of the water filling the washer will not be higher nor may it be bypassed by the user.

DESCRIPTION OF THE PREFERRED EMBODIMENT

Figure 1:
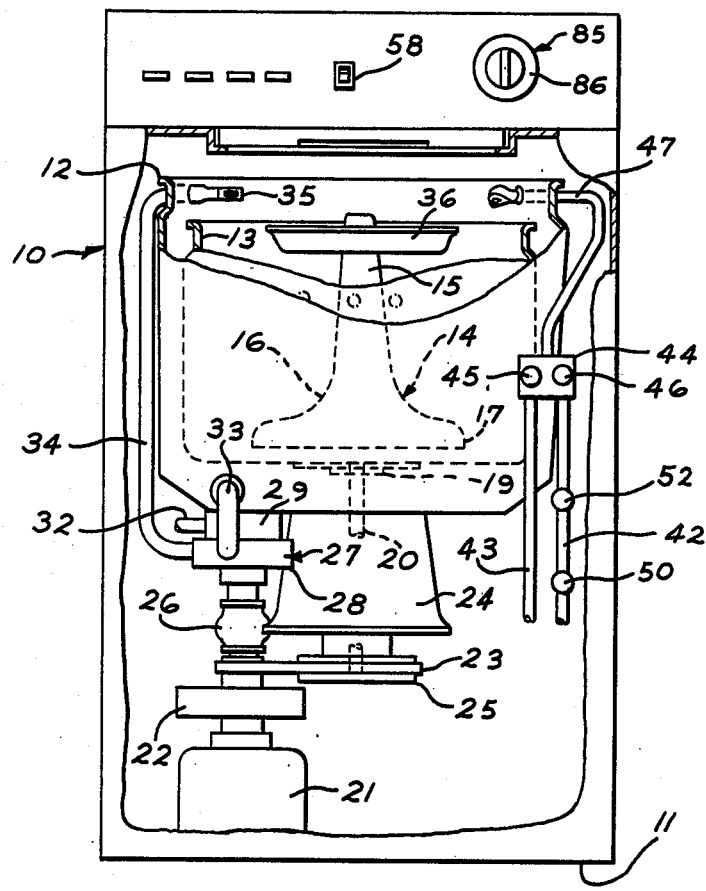
FIG. 1 is a schematic front elevational view of a clothes washer incorporating my invention, the view being partly broken away and partly in section.

Referring now to the drawing, and initially to FIG. 1 thereof, there is illustrated an agitator-type vertical-axis automatic clothes washer 10 having a supporting structure or load member 11. The washer may include the various operational components conventionally utilized in a domestic automatic washing machine, for instance, an imperforate tub 12 rigidly mounted within structure 11. Rotatably supported within tub 12 is a perforate washing basket 13 for washing and rinsing clothes therein and for centrifugally extracting liquid therefrom. At the center of basket 13 there is provided an agitator 14 which includes a center post 15 having a plurality of water or liquid circulating vanes 16 joined at their lower end to form an outwardly flared skirt 17.

Both the clothes basket 13 and the agitator 14 are rotatably mounted. The basket 13 is mounted on a hub 19 and the agitator 14 is mounted on a shaft 20 which extends upwardly through the hub 19 and through the center post 15 and is secured to the agitator so as to drive it. During one possible cycle of operation of the washer 10, fabrics, detergent and a predetermined quantity of liquid are introduced into the tub 12 and basket 13, and the agitator is then oscillated back and forth about its axis to move the clothes within the basket. After a predetermined period of this washing action, the agitator and basket 13 are rotated in unison at high speed to centrifugally extract the washing liquid from the fabrics and discharge it to a drain (not shown). Following this extraction operation, a supply of clean liquid is introduced into the basket for rinsing the fabrics and the agitator is again oscillated. Finally, the agitator and basket are once more rotated in unison at high speed to extract the rinse liquid.

The basket 13 and agitator 14 may be driven by any suitable means. By way of example, I have shown them as driven by a reversible motor 21 through a drive mechanism including a clutch 22 mounted on the motor shaft. The motor is tailored so as to be used to its full extent when it accelerates the basket 13 to spin speed. In order to assist the motor during starting, clutch 22 allows the motor to start with less than a full load and then accept the full load as it comes up to speed. A suitable belt 23 transmits power from clutch 22 to a transmission assembly 24 through a pulley 25. Thus, depending upon the direction of motor rotation, the pulley 25 of transmission 24 is driven in opposite directions. The transmission 24 is so arranged that it supports and drives both the agitator drive shaft 20 and the basket mounting hub 19. When motor 21 is rotated in one direction, the transmission causes agitator 14 to oscillate and when motor 21 is driven in the opposite direction, the transmission causes the clothes basket 13 and agitator 14 to rotate together at high speed for centrifugal fluid extraction.

In addition to operating the transmission 24 as described, motor 21 also provides a direct drive through a flexible coupling 26 to a pump structure 27, which includes two separate pumping units 28 and 29 which are operated simultaneously in the same direction by motor 21. Pump unit 29 has an inlet connected to the tub 12 and an outlet connected by a conduit 32 to a suitable external drain (not shown). Pump 28 has an inlet connected by a conduit 33 to the interior of tub 12 and an outlet connected by conduit 34 to a nozzle 35 which is positioned to discharge into a suitable perforate bottomed filter pan 36 which may be secured to the top portion of agitator 14 so as to be movable therewith but removable therefrom. With this structure, then, when the motor 21 is operating so as to provide the washing mode or agitation, pump unit 28 draws liquid in from tub 12 and discharges it through conduit 34 into filter pan 36, and then down through the small openings provided in the bottom of the filter pan back into the basket. Conversely, when the motor is reversed so as to rotate the basket 13 and agitator 14 together at high speed to centrifugally extract fluid from fabrics in the basket, pump unit 29 will draw liquid from the tub and discharge it through conduit 32 to drain. Each of the pump units is substantially inoperative in the direction of rotation in which it is not used.

Hot and cold water may be supplied to the machine through conduits 42 and 43 which are adapted to be connected respectively to sources of hot and cold water (not shown). Conduits 42 and 43 extend into a valve structure 44 having solenoids 45 and 46 and being connected to a hose 47. Energization of solenoids 45 and 46 will provide the passage of hot, cold or warm water from the valve structure 44 through the hose 47. Hose 47 is positioned to discharge into the basket 13 so that when one or both of solenoids 45 and 46 are energized, water enters basket 13 and tub 12.

Figure 2:
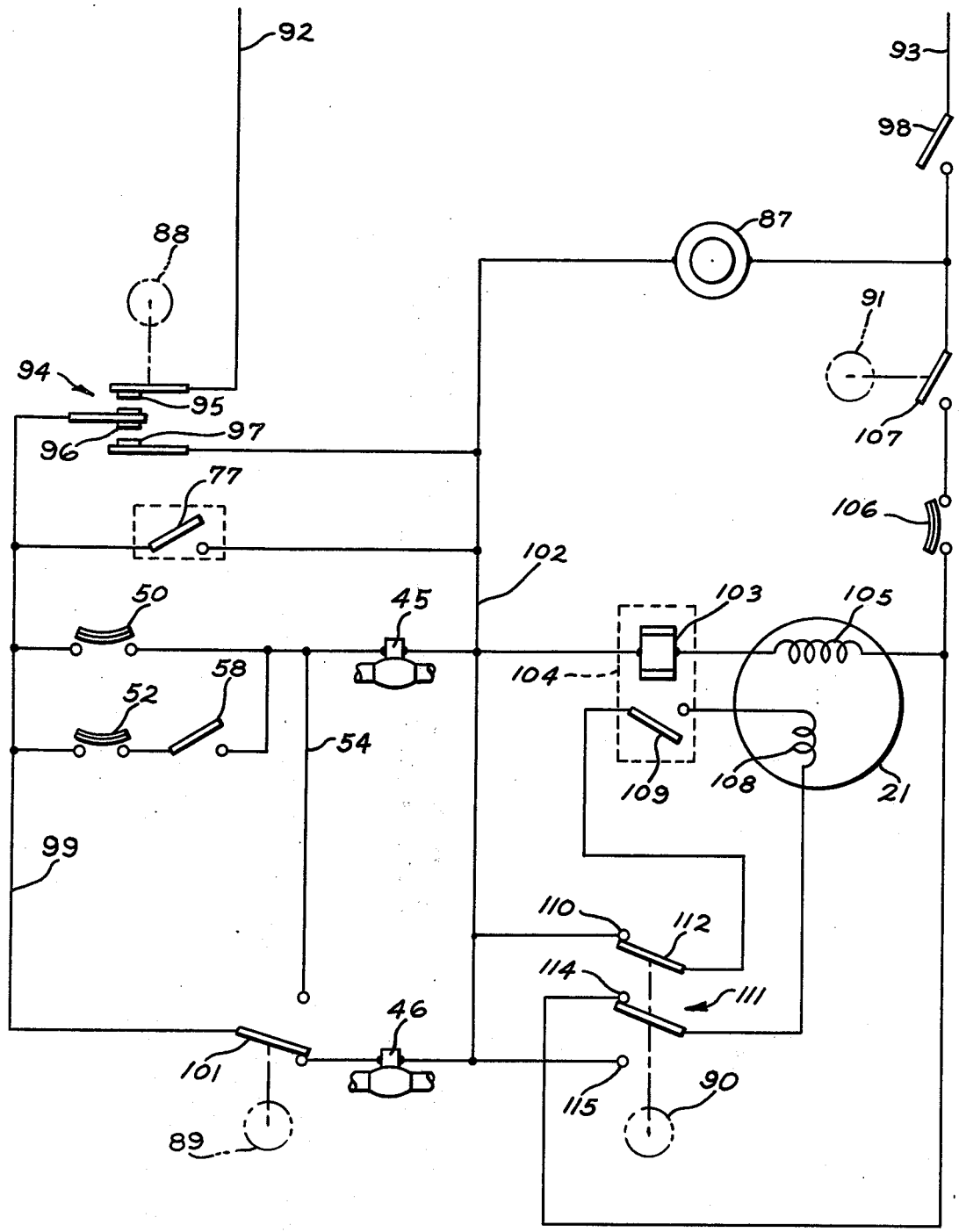
FIG. 2 is a schematic diagram of an electric control circuit that may be used with my invention in the clothes washer of FIG. 1.

Completing now the description of the electrical control system for the machine of FIG. 1, reference is made to FIG. 2. At the heart of this control system is a sequence control assembly designated generally in FIG. 1 by the numeral 85 having a dial 86. Forming a part of the sequence control assembly 85 is a timer motor 87 which drives a plurality of cams 88, 89, 90 and 91. These cams, during their rotation by the timer motor, actuate various switches (as will be described), causing the machine to pass through the cycle of operations which includes washing, spinning, rinsing and spinning.

It will be understood that present day washers often include various improvements such as control panel lights, etc., which do not relate to the present invention and have been omitted for the sake of simplicity and ease of understanding.

The electric circuit, as shown in FIG. 2, as a whole is energized from a power supply (not shown) through a pair of conductors 92 and 93. Cam 88 controls a switch 94 which includes contacts 95, 96 and 97; when the cam has assumed the position where all three contacts are separated, washer 10 is disconnected from the power source and is inoperative. When operation of washer 10 is to be initiated as will be explained below, switch 94 is controlled by cam 88 so that contacts 95 and 96 are engaged. When a main switch 98 is closed (by any suitable manual control, not shown), power is then provided to the control circuit of the machine from conductor 92 through contacts 95 and 96.

From contact 96, the circuit is completed from conductor 99 through a switch 101 controlled by cam 89. In the "up" position, switch 101 completes a circuit for solenoid 45; in the "down" position shown, the switch 101 completes a circuit for solenoid 46.

The improved water temperature control apparatus and method includes a first means for sensing a first predetermined temperature level of incoming hot water and in the preferred embodiment is a normally open temperature responsive switch 50, such as a thermostat, which is selected and preset to be responsive to a temperature level preferably within the range of 150° to 180° F. That is, the temperature responsive switch 50 may be preset to a temperature level within that range so that the switch will close when the incoming hot water reaches the preset temperature level. There is also provided a second means for sensing a second predetermined level of incoming hot water and that means in the preferred embodiment is a temperature responsive switch 52 which is normally open and is responsive to a second temperature level lower than the first temperature level of temperature responsive switch 50. Switch 52 is preset to be responsive to a temperature level preferably within the range of 120° to 150° F. Both temperature responsive switches 50 52 are located to sense the temperature of the incoming supply hot water and may be connected from conductor 99 to conductor 54 and be in electrical contact with solenoid 45 of the cold water valve. Associated with the temperature responsive switch 52 is a switch 58 which may be manually controlled by the user of the clothes washer and is conveniently positioned on the backsplash or control panel of the clothes washer. Switch 58 provides means to bypass the second means for sensing the second predetermined temperature level of the incoming hot water. Therefore, with this arrangement, the user of the machine may select either a hot water fill or a warm water fill by means of switch 58 and the temperature of the water filling the clothes washer will not be higher than the corresponding preset temperature level of the temperature responsive switch.

From the hot and cold water solenoids, the energizing circuit then extends through a conductor 102 and then to a coil 103 of a relay 104, the main or run winding 105 of motor 21, a conventional motor protector 106, a switch 107 controlled by cam 91, and the conductor 93.

Motor 21 is of the conventional induction type which is provided with a start winding 108 which assists the main winding 105 during starting of the motor and is energized in parallel therewith. When a relatively high current passes through the relay coil 103, it causes the normally open switch 109 to close; this permits an energizing circuit for the start winding to be completed in parallel with the main winding through a conduit 110 of the switch generally indicated at 111 and which is controlled by cam 90, contact arm 112, the relay contact 109, the start winding 108, a contact arm 113, and the contact 114 of switch 111. A circuit is also completed in parallel with motor 21 through the timer motor 87. Relay 104 is designed to close contact 109 when a relatively high current, of the level demanded by the motor when the motor is rotating below a predetermined speed, is passing through it. At other times, when there is no current passing through the relay coil 103, or when the current is below the required energizing level as is true in the running speed range of the motor, the contact 109 is open.

When the main winding 105 of motor 21 is in series with valve solenoids 45 and 46, as described, a much lower impedance is presented in the circuit by the motor 21 than is presented by the valve solenoids. As a result, the greater portion of the supply voltage is taken up across the solenoids and relatively little across the motor. This causes whichever of the solenoids is connected in the circuit to be energized sufficiently to open its associated water valve. As a result, water at whichever of the two temperatures is selected is admitted to the machine through hose 47, motors 21 and 87 remaining inactive.

This action continues, with the circuitry thus arranged, so that water is admitted to basket 13 and tub 12. Because of the perforations in basket 13, the water rises in both basket 13 and tub 12 at the same rate. During the fill, assuming that the clothes washer user has selected the hot water fill by opening switch 58 thus bypassing the second temperature responsive switch for sensing the second predetermined temperature level of the incoming hot water, so that only hot water is introduced into basket 13. Should the temperature of the incoming hot water reach or exceed the preset temperature at which the temperature responsive switch 50 will respond, then the normally open switch 50 will close thus actuating solenoid 45 and opening the inlet cold water valve so that cold water may be mixed with hot water. If the clothes washer user selected a warm water fill and thus closed switch 58, then again only inlet hot water would initially be introduced into the machine until the inlet hot water reaches or exceeds the second predetermined temperature level thus causing the normally open temperature responsive switch 52 to close and in turn actuate solenoid 45 to thus open the cold water valve to allow mixing of cold water with the hot water.

Water level control switch 77 is connected across conductors 99 and 102 as shown, so that when switch 77 closes, it excludes the solenoids 45 and 46 from the effective circuit by short circuiting them. As a result, the solenoids become de-energized and a high potential drop is provided across winding 105 of motor 21. This causes the relay 104 to close switch 109 to start the motor 21 while, at the same time, timing motor 87 starts so as to initiate the sequence of operations. It will be observed that the energization of the valve solenoids 45 and 46 on the one hand, and the energization of the drive motor 21 on the other hand are alternative in nature. In other words, when there is sufficient potential across the valve solenoids to energize them, the motor remains de-energized, and it is necessary to short the solenoids out of the circuit so that they are de-energized before the drive motor can be energized.

The switch 107 is in series with the main motor 21 but is not in series with the timer motor 87. Thus, by the opening of switch 107, the energization of motor 21 may be stopped. The timer motor will continue to operate though, as a result of the fact that the timer motor 87 is deliberately provided with an impedance much greater than that of the valve solenoids so that it will take up most of the supplied voltage and the solenoids therefore do not operate their respective valves.

A further point of the circuit of FIG. 2 is that when switch arms 112 and 113 are moved by cam 90 to engage contact 114 and a contact 115 respectively, the polarity of the start winding is reversed. The circuit from conductor 102 then proceeds through contact 115, contact arm 113 to start winding 108, relay contact 109, contact arm 112 and contact 114 to the protective device 106 and conductor 93. Thus, provided motor 21 is stopped or slowed down so that relay contact 109 is closed, the reversal of switch 111 is effective to cause the motor 21 to rotate in the opposite direction when the motor is started up again.

In order to energize motor 21 independently of the water level switch 77 and the valve solenoid, so that a spin operation may be provided without regard to the absence of the predetermined water level, cam 88 is formed so that it may close all three contacts 95, 96 and 97 of switch 94 during centrifugal liquid extraction steps. When this occurs, it causes the power to be supplied from conductor 92 directly through contact 97 to conductor 102 and the motor rather than through the water level switch or the valve solenoids.

Figure 3:
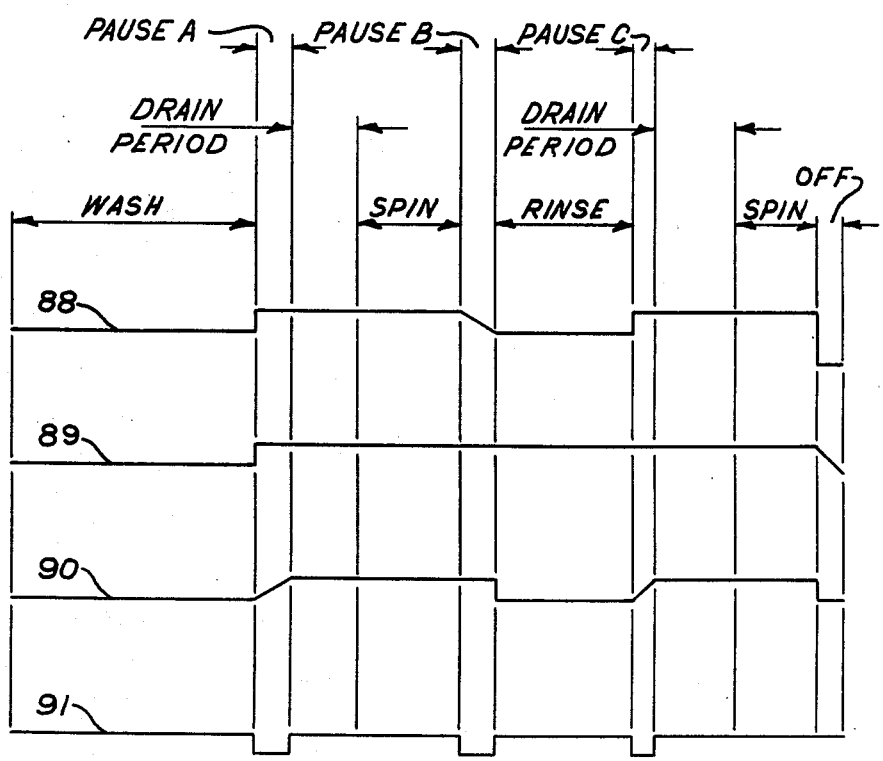
FIG. 3 is a schematic view of the cam surfaces used in the control of the timer operated switches of FIG. 2.

Referring now to FIG. 3 in conjunction with FIGS. 1 and 4, a sequence of operations of the washer 10 will be described. It will be assumed that the timer has been set at the beginning of the wash step so that cam 88 has caused contacts 95 and 96 to be closed, cam 89 has caused contact 101 to move to its "down" position, cam 90 has positioned switch 111 as shown, and cam 91 has closed switch 107. At this point, with main switch 98 closed, the first step which takes place, because of the aforementioned impedance relationship, is the filling of the machine with water by the energization either of the solenoid 46 alone to provide hot water or else, if switch 58 has been manually closed, by the energization of solenoids 45 and 46 together when the incoming hot water temperature is at or above the preset temperature at which switch 52 is responsive to cause warm water to be provided to the machine. The energization of the solenoids causes motors 21 and 87 to remain inactive until the closure of switch 77 at a predetermined liquid level.

At this point, the solenoid or solenoids are de-energized and, consequently, motors 21 and 87 are energized. The energization of motor 21 is in the direction to cause agitator operation (because of switch 111) and to provide a recirculation action by pump 28, drawing water from the tub through inlet conduit 33 and then discharging it back into the tub through outlet conduit 34. This action, which conventionally is called the washing operation or wash mode, continues for a predetermined time until pause A is reached, at which time cam 91 opens switch 107. This stops the operation of motor 21 and consequently there is no further agitation although, as explained, the timer motor 87 continues to operate. During pause A, cam 88 closes all three contacts 95, 96 and 97 of switch 94 together to connect conductor 102 entirely independently of water level switch 77 and so as to exclude the valve solenoids 45 and 46. Also at this time cam 90 reverses the position of switch 111. The reversal of switch 111 reverses the polarity of start winding 108 relative to main winding 105. As a result, when switch 107 is re-closed by cam 91, motor 21 is energized once again but in the opposite direction. This is the end of pause A. The motor 21 is then driving the pump 29. The energization of the motor 21 and the de-energization of the valve solenoids result from the fact that the valve solenoids are by-passed by the new condition of switch 94. As a result of the opposite rotation of motor 21 from that of the wash mode, the motor causes a spin operation and simultaneously operates the pump 29. The pump 28 is ineffective during this operation, tending to draw in fluid through conduit 34 and expel it through conduit 33.

The spin operation is provided at a relatively high speed of rotation of the basket which may, for instance, be on the order of 600 r.p.m. so as to extract a very substantial part of the liquid from the clothes and have it removed by the pump 29. The spin operation continues until pause B, as shown in FIG. 3, at which time switch 107 is again opened by cam 91 to de-energize motor 21. At this time, cam 88 returns switch 94 to the same position that it had for wash. In addition, it is conventional at this time to change the position of switch 101 to its "up" position so that the cold water solenoid is energized. Switch 94 also returns to the same position that it had for wash, with the contact 97 disengaged from the other two contacts, and the motor connections are reversed to provide agitation rather than spin action. Thus, when pause B is terminated by the reclosing of the switch 107 by cam 91, water enters the basket until the switch 77 is tripped, and then an agitation step proceeds in the same manner as the wash step, that is, by the shorting out of the valve solenoid by switch 77.

After a suitable rinsing period, another pause designated C, is provided and also a drain period followed by another spin operation performed in the same manner as before between the wash and spin modes, after which cam 88 opens all three contacts of switch 94 to terminate the operation completely by de-energizing all components of the system.

It should be noted that while the use of a relay 104 is shown and described in the preferred embodiment above, a motor having a centrifugal switch for controlling the start winding may be used in place of the relay 104 and accomplish the same desirable function. Therefore, the function of relay 104 and the function of a centrifugal switch that controls the start winding of the motor are equivalent in operative effect.

The foregoing is a description of the preferred embodiment of the invention and variations may be made thereto without departing from the true spirit of the invention, as defined by the appended claims.

What is claimed is:

1. In an automatic washer having an inlet hot water valve and an inlet cold water valve, the improvement in controlling the temperature of fill water comprising:
    (a) means to keep the inlet hot water valve continuously open during fill,
    (b) means to keep the inlet cold water valve normally closed during fill,
    (c) first means for sensing a first predetermined temperature level of incoming hot water,
    (d) second means for sensing a second predetermined level of incoming hot water, said second temperature level being lower than the first temperature level,
    (e) switch means to bypass the second means for sensing the second predetermined temperature level of the incoming hot water, and
    (f) control means to open the cold water valve when,
        (i) both the hot water temperature is above the first temperature level and the second sensing means is by-passed, and
        (ii) when the second sensing means is not by-passed and the hot water temperature is above the second temperature level.

2. In the automatic washer of claim 1 wherein the first means for sensing a first predetermined temperature level of incoming hot water is a temperature responsive device normally open at and below said first predetermined temperature level.

3. In the automatic washer of claim 2 wherein second means for sensing a second predetermined level of incoming hot water is a temperature responsive device normally open at and below said second predetermined temperature level.

4. In the automatic washer of claim 1 wherein the switch means is manually operated.

5. In the automatic washer of claim 1 wherein the first means for sensing a first predetermined temperature level of incoming hot water is responsive to a temperature in the range of 150° to 180° F.

6. In the automatic washer of claim 5 wherein the second means for sensing a second predetermined level of incoming hot water is responsive to a temperature in the range of 120° to 150° F.

7. The method of controlling the temperature of fill water for an automatic washer having an inlet hot water valve and an inlet cold water valve comprising:
    (a) keeping the inlet hot water valve continuously open during fill,
    (b) keeping the inlet cold water valve normally closed during fill, (c) sensing a first predetermined temperature level of incoming hot water, (d) sensing a second predetermined level of incoming hot water, said second temperature level being lower than the first temperature level, (e) bypassing, alternatively, the sensing of the second predetermined temperature level of the incoming hot water, and (f) opening the cold water valve when,
  (i) both the hot water temperature is sensed above the first temperature level and the second hot water temperature sensing is bypassed, and
  (ii) when the second sensing of the hot water is not bypassed and the hot water temperature is above the second temperature level being sensed.

8. The method of controlling the temperature of fill water for an atuomatic washer of claim 7 wherein bypassing the sensing of the second predetermined temperature level of the incoming hot water is by manually operating switching means.

9. The method of controlling the temperature of fill water for an automatic washer of claim 7 wherein sensing a first predetermined temperature level of incoming hot water is within the range of 150° to 180° F.

10. The method of controlling the temperature of fill water for an automatic washer of claim 9 wherein sensing a second predetermined level of incoming hot water is within the range of 120° to 150° F.

* * * * *